United States Patent [19]

Haruyama et al.

[11] Patent Number: 5,119,099
[45] Date of Patent: Jun. 2, 1992

[54] MICROWAVE RESPONDER

[75] Inventors: Shinichi Haruyama, Gunma; Fusao Sekiguchi, Tokyo; Yoshikazu Kawashima; Ko Ishikawa, both of Kanagawa, all of Japan

[73] Assignees: Yamatake-Honeywell Co., Ltd.; Yokowo Co., Ltd., both of Tokyo, Japan

[21] Appl. No.: 526,506

[22] Filed: May 21, 1990

[30] Foreign Application Priority Data

Jun. 2, 1989 [JP] Japan .................. 1-141830

[51] Int. Cl.⁵ .............................................. G01S 13/80
[52] U.S. Cl. ........................................ 342/51; 342/175
[58] Field of Search .................. 342/51, 42, 44, 50, 342/175; 343/700 MS

[56] References Cited

U.S. PATENT DOCUMENTS

| | | | |
|---|---|---|---|
| 3,781,879 | 12/1973 | Staras et al. | 342/159 |
| 3,996,587 | 12/1976 | Rosen | 342/51 |
| 4,001,822 | 1/1977 | Sterzer | 342/44 |
| 4,015,259 | 3/1977 | Siverhus et al. | 342/44 |
| 4,068,232 | 1/1978 | Meyers et al. | 342/44 |
| 4,123,754 | 10/1978 | Armstrong | 342/44 |
| 4,314,373 | 2/1982 | Sellers | 455/73 |
| 4,331,957 | 5/1982 | Enander et al. | 342/22 |
| 4,567,473 | 1/1986 | Lichtblau | 340/572 |
| 4,606,054 | 8/1986 | Amitay et al. | 342/362 X |
| 4,656,478 | 4/1987 | Leuenberger | 342/51 |
| 4,679,046 | 7/1987 | Curtis et al. | 342/51 |
| 4,786,907 | 11/1988 | Koelle | 342/51 |
| 4,885,588 | 12/1989 | Kawakami | 342/51 |
| 4,890,111 | 12/1989 | Nirolet et al. | 342/51 |

FOREIGN PATENT DOCUMENTS

3143915A1 5/1983 Fed. Rep. of Germany .
60-213104 10/1985 Japan .

*Primary Examiner*—John B. Sotomayor
*Attorney, Agent, or Firm*—Blakely, Sokoloff, Taylor & Zafman

[57] ABSTRACT

A microwave responder resonates or does not resonate with a microwave transmitted from a radio transmitter, and radiates the resonated microwave as a response signal wave. Two microstrip lines are linearly arranged to be separated from each other at a predetermined interval. A diode which is switched between ON and OFF states in response to the response signal is interposed between two end portions of the microstrip lines separated by the predetermined interval, and a distance, between distal ends of the two linearly arranged microstrip lines, which includes an impedance defined by the ON or OFF state of the diode is determined to be ½ a wavelength of the microwave.

6 Claims, 4 Drawing Sheets

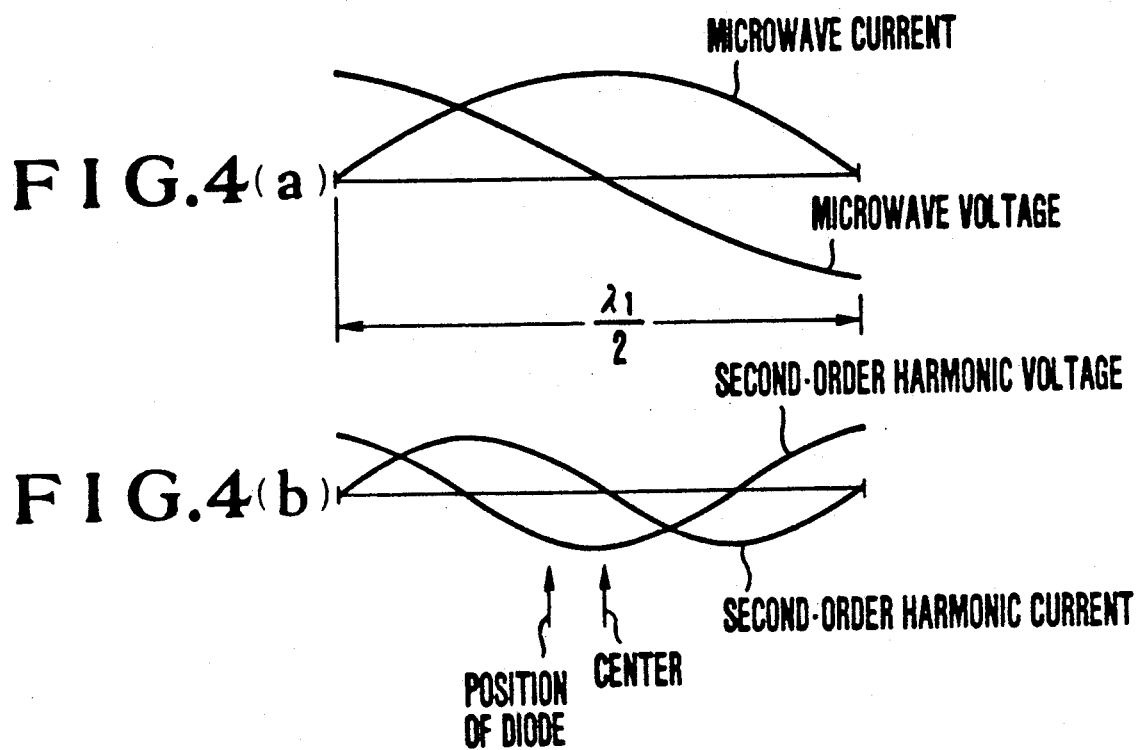
FIG.4(a)
FIG.4(b)
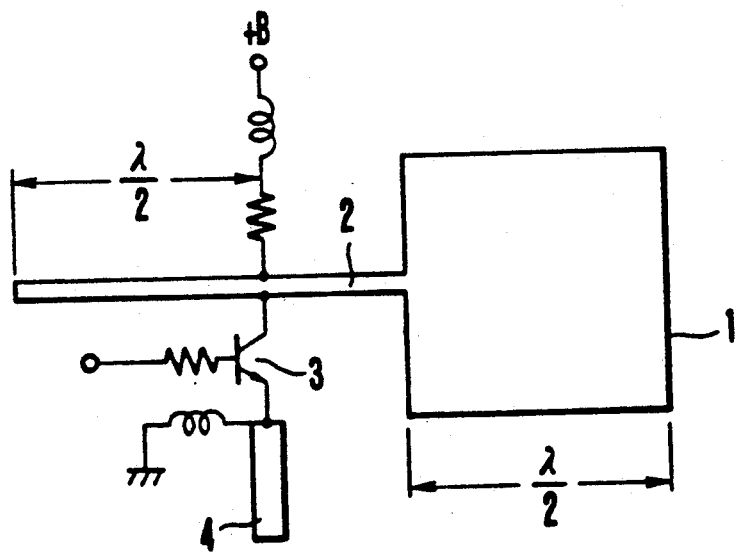
FIG.9
(PRIOR ART)

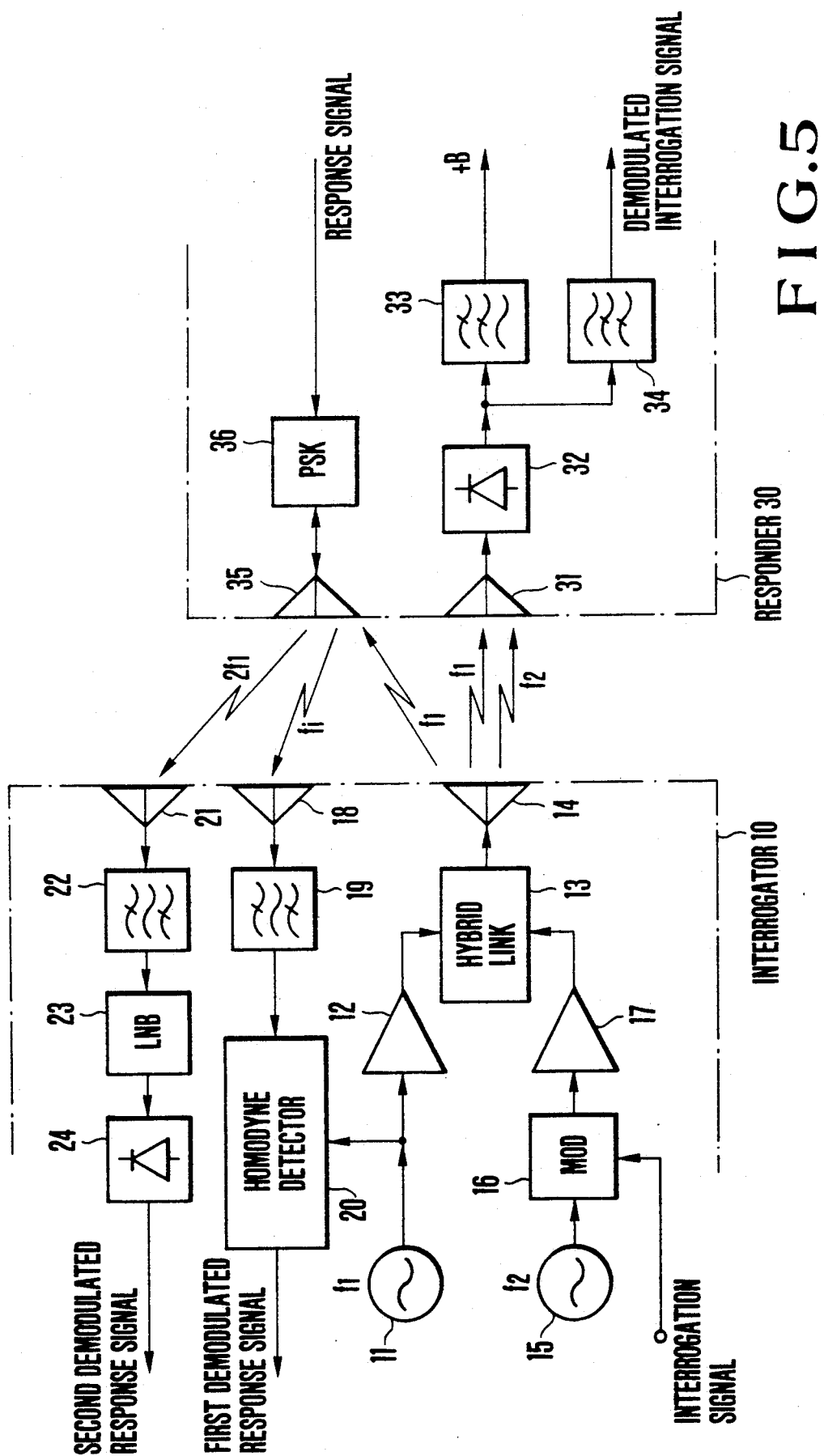

MICROWAVE RESPONDER

BACKGROUND OF THE INVENTION

The present invention relates to a microwave responder which resonates or does not resonate with a microwave in accordance with a response signal, radiates the resonated microwave, and generates a harmonic component upon resonance to radiate a harmonic signal wave which is amplitude-modulated by the response signal.

In recent years, there is proposed a communication system in which a responder is carried by a person or is attached to a mobile object, proper information is stored in the responder, a microwave is transmitted to the responder from a stationary radio transmitter, and the responder receives the microwave and sends a response signal wave modulated by a response signal. Depending on information to be stored in the responder, the responder can serve as an ID card, a driver's license, a specification instruction manual in a production line, and the like. Since the communication system uses the received microwave as a carrier wave of the response signal wave, the responder itself does not require an oscillation circuit, and power consumption of the responder can be very small. Thus, when an electric power of the received microwave is converted to a DC power to be used as a driving power source, the responder itself need not incorporate a battery or need not be externally supplied with a commercial AC power source through cables.

FIG. 9 shows an example of a conventional microwave responder which receives a microwave, phase-modulates it by a response signal, and sends back the modulated microwave as a response signal wave in the communication system as described above.

In FIG. 9, a rectangular microstrip resonator 1 whose one side has a length corresponding to ½ a wavelength λ of a microwave to be received is arranged on a low-dielectric substrate (not shown) on the lower surface of which a ground plate is disposed. A microstrip line 2 having a length larger than the ½ wavelength is connected to the central portion of the one side of the resonator 1. A short-circuiting stub 4 is connected through a transistor 3 to a position of the microstrip line 2 corresponding to the ¼ wavelength from its free end, so that an ON/OFF state of the transistor 3 is switched in response to a response signal.

In this arrangement, when the transistor 3 is OFF, a microwave received by the microstrip resonator 1 is reflected by the free end of the microstrip line 2 and is radiated again from the microstrip resonator 1. When the transistor 3 is ON, the microstrip line 2 is, in effect, short-circuited at the position where the transistor 3 is connected. The microwave is reflected at this position, and is radiated again from the microstrip resonator 1 while the phase of the microwave is shifted by 90°. In this manner, the effective length of the microstrip line for reflecting the received microwave is switched by a response signal, and the received microwave is phase-modulated and is sent back as a response signal.

In the conventional microwave responder shown in FIG. 9, the microstrip resonator 1 and the microstrip line 2 are connected to each other, and the total size must be larger than one wavelength of a microwave to be received, i.e., a large space is required. Thus, a demand has arisen for a compact responder.

The response signal wave sent back from the responder has a very weak electric field intensity, and is easily influenced by fading or noise. Thus, a system which can discriminate whether or not a response signal can be accurately transmitted is demanded. For this purpose, the same response signal is transmitted by a carrier wave having a frequency different from that of the response signal wave, and two demodulated response signals transmitted by the two different carrier waves are compared. If a coincidence between the two signals is detected, it can be determined that the response signal wave is not influenced by, e.g., fading. As the carrier wave having a frequency different from that of the response signal wave, a harmonic component corresponding to an integer multiple of a microwave may be used. In this case, the harmonic component is amplitude-modulated by a response signal, and is radiated as a harmonic signal wave. However, the conventional microwave responder itself cannot radiate a harmonic component, and a means for generating a harmonic signal wave must be separately added.

SUMMARY OF THE INVENTION

It is therefore an object of the present invention to provide a microwave responder which can send back a phase-modulated response signal wave by a simple arrangement, and can radiate an amplitude-modulated harmonic component as a harmonic signal wave.

In order to achieve the above object, according to the present invention, there is provided a microwave responder which resonates or does not resonate with a microwave transmitted from a radio transmitter, and radiates the resonated microwave as a response signal wave, and wherein two microstrip lines are linearly arranged to be separated from each other at a predetermined interval, a diode which is switched between ON and OFF states in response to the response signal is interposed between the two end portions of the microstrip lines separated by the predetermined interval, and a distance, between distal ends of the two linearly arranged microstrip lines, which includes an impedance defined by the ON or OFF state of the diode is determined to be ½ a wavelength of the microwave.

BRIEF DESCRIPTION OF THE DRAWINGS

FIGS. 4($a$) and 4($b$) are charts for explaining an operation for strongly generating a harmonic component;

FIG. 5 is block diagram showing a communication system to which the microwave responder of the present invention can be suitably applied;

FIG. 9 is a view showing a structure of a conventional microwave responder which phase-modulates a received microwave by a response signal, and sends it back as a response signal wave.

DESCRIPTION OF THE PREFERRED EMBODIMENTS

Figure 1:
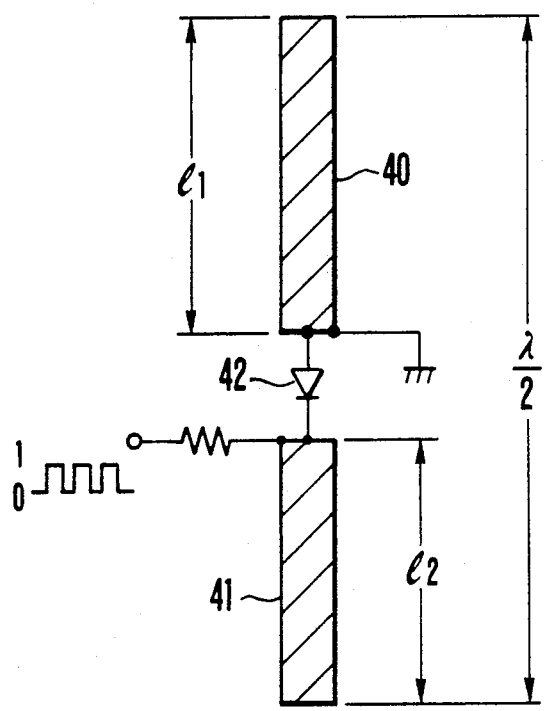
FIG. 1 is a view showing a structure of an embodiment of a microwave responder according to the present invention.

An embodiment of the present invention will now be described with reference to FIGS. 1 to 5.

A communication system to which a microwave responder of the present invention is applied will be described below with reference to FIG. 5. In FIG. 5, in an interrogator 10, a first-frequency signal $f_1$ output from a first oscillator 11 is amplified by an amplifier 12, and the amplified signal is supplied to a hybrid link 13. The amplified signal is converted into two signals having a 90° phase difference therebetween by the hybrid link 13. A circularly polarized wave is generated by these two signals, and is transmitted as an energy wave from a circularly polarized wave antenna 14 by, e.g., a left-hand polarized wave without being modulated toward a responder 30. A second-frequency signal $f_2$ output from a second oscillator 15 is amplitude-modulated with an interrogation signal by a modulator 16, and the modulated signal is then amplified by an amplifier 17. The amplified signal is supplied to the hybrid link 13, and is similarly converted into two signals having a 90° phase difference therebetween. A circularly polarized wave is generated by these two signals, and is transmitted as an interrogation signal wave from the circularly polarized wave antenna 14 by a right-hand polarized wave toward the responder 30. Since the first- and second-frequency signals $f_1$ and $f_2$ are satisfactorily isolated from each other, they will not influence each other or be mixed each other.

The interrogator 10 comprises an antenna 18 for receiving a response signal wave which is transmitted from the responder 30 and corresponds to the phase-modulated first-frequency signal $f_1$. The response wave signal received by the antenna 18 is supplied to a band-pass filter 19, and only a first-frequency component $f_1$ is extracted therefrom. The first-frequency component $f_1$ is supplied to a homodyne detector 20. The homodyne detector 20 receives the first-frequency signal $f_1$ from the first oscillator 11 as a detection carrier wave, and homodyne-detects and demodulates the response signal wave as a first demodulated response signal.

When the responder 30 phase-modulates the first-frequency $f_1$, a harmonic component is generated as if it were amplitude-modulated by a response signal. The interrogator 10 has an antenna 21 for receiving this harmonic signal wave. The harmonic signal wave received by the antenna 21 is supplied to a band-pass filter 22, and only a second-order harmonic component is extracted thereby. The second-order harmonic component is then supplied to a low-noise block-down converter 23 and a detector 24, thus demodulating a second demodulated response signal. The first and second demodulated response signals are compared by a microprocessor (not shown), or the like. When a coincidence is detected between the two signals, it can be confirmed that a response signal is accurately demodulated without being influenced by fading or noise.

The responder 30 comprises a circularly polarized wave antenna 31 which has a bandwidth capable of receiving both the energy wave and the interrogation signal wave transmitted from the circularly polarized wave antenna 14. The energy wave and the interrogation signal wave received by the circularly polarized wave antenna 31 are rectified by a rectifier 32. A DC component is extracted from the rectification output through a low-pass filter 33, and is utilized as a DC power+B, i.e., a drive power source of the responder 30. A signal component is extracted from the rectification output through a low-pass filter 34, and is properly processed by the microprocessor (not shown), or the like as a demodulated interrogation signal.

The responder 30 also comprises an antenna 35 for receiving the energy wave transmitted from the circularly polarized wave antenna 14 of the interrogator 10. The energy wave received by the antenna 35 and serving as a carrier wave for the response signal wave is supplied to a phase modulator 36, and is phase-modulated by a response signal output from the microprocessor or the like. The phase-modulated signal is sent back again from the antenna 35 toward the interrogator 10 as a response signal wave. Upon modulation by the phase modulator 36, a harmonic component is generated as if it were amplitude-modulated by the response signal, and is also radiated from the antenna 35 as a harmonic signal wave.

An embodiment of the microwave responder according to the present invention, which is applied as the antenna 35 and the phase modulator 36 shown in FIG. 5, will be described below with reference to FIGS. 1 to 4.

Referring to FIG. 1, in the microwave responder of the present invention as the antenna 35 and the phase modulator 36, two microstrip lines 40 and 41 are linearly arranged to be separated from each other at a predetermined interval on a low-dielectric substrate (not shown) on the lower surface of which a ground plate is disposed. A diode 42 is interposed between two end portions of the lines 40 and 41 separated by the predetermined interval. The anode of the diode 42 is grounded, and a response signal consisting of "1"s and "0"s is supplied to the cathode.

Figure 2:
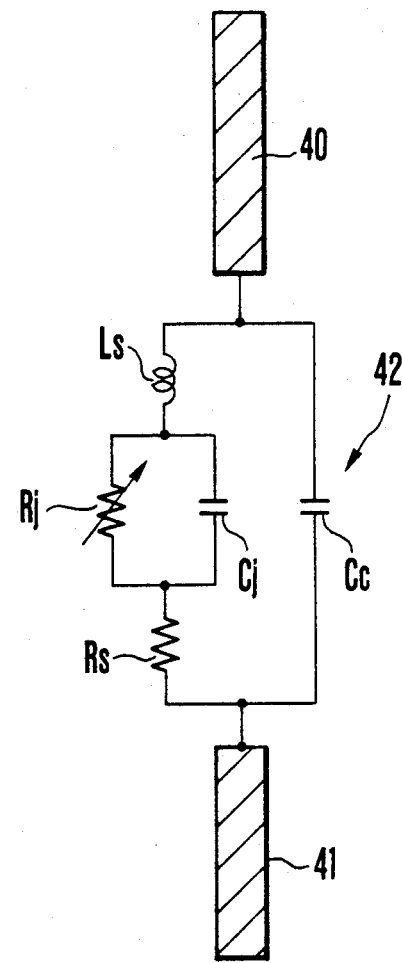
FIG. 2 is an equivalent circuit diagram of a diode shown in FIG. 1.
Figure 3:
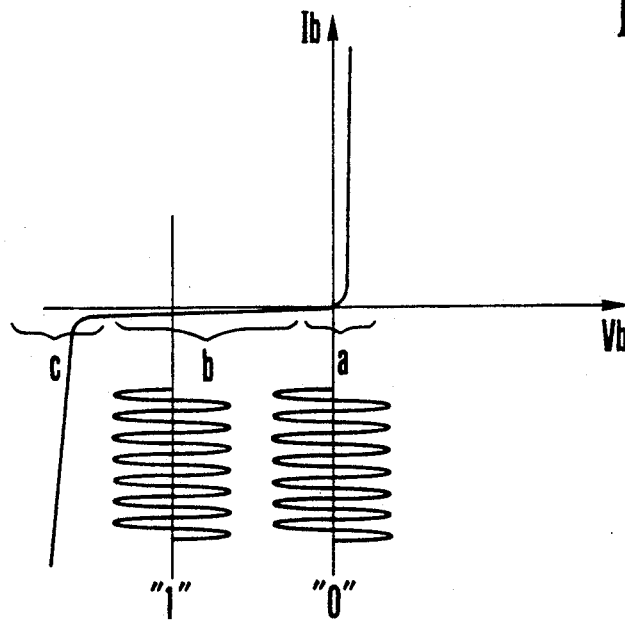
FIG. 3 is a view showing a bias state of the diode shown in FIG. 1.

In an equivalent circuit of the diode 42, as shown in FIG. 2, a lead resistance $R_s$ and a lead inductance $L_s$ are connected in series with a parallel circuit of a junction resistance $R_j$ and a junction capacitance $C_j$, and the series circuit is connected in parallel with a case capacitance $C_c$. In response to a response signal "0", the diode 42 is biased to a forward rise voltage region a, as shown in FIG. 3, and the junction resistance $R_j$ becomes almost zero. In response to a response signal "1", the diode 42 is biased to a blocking region b, and the junction resistance $R_j$ becomes almost infinity.

A distance, between the distal ends of the two microstrip lines 40 and 41, including the diode 42 of an ON state impedance is formed to have an effective length ½ a wavelength $\lambda_1$ of a microwave at the first frequency $f_1$ as the energy wave. When the diode 42 is ON, a microstrip resonator which resonates with the microwave is constituted. The two microstrip lines 40 and 41 have different lengths $l_1$ and $l_2$ to be matched with the diode 42 due to a difference in impedance when the diode 42 is viewed from the anode and cathode sides. The lengths $l_1$ and $l_2$ of the microstrip lines 40 and 41 are set to be offset from the center of the distance between the distal ends of the two microstrip lines 40 and 41.

In this arrangement, when the response signal is "0", the microstrip resonator receives the microwave and is set in a resonance state, so that the resonated microwave is radiated. When the response signal is switched to be "1", the impedance of the diode 42 is changed, and the resonance frequency of the microstrip resonator is shifted from that of the microwave. As a result, the microstrip resonator is released from the resonance state. For this reason, the microwave is transmitted through the microstrip resonator, and is reflected by other structures around the resonator. Thus, the microwave is additionally phase-modulated as compared to a case wherein the response signal is "0". The microwave responder has a size ½ a wavelength of the microwave, i.e., is compact, and has a very simple structure.

Upon resonance of the microwave, a large current close to a current antinode is flowed through the diode 42, as shown in FIG. 4(a). When the response signal is "0", the diode 42 is in an ON state, and is biased to the forward rise voltage region a, as shown in FIG. 3, so that a degree of nonlinearity of the diode 42 is enhanced, and a harmonic component is strongly generated. In addition, since the diode 42 is disposed to be offset from the center of the distance between the distal ends of the microstrip lines 40 and 41, it is located at a position offset from a current node of a second-order harmonic, as shown in FIG. 4(b). For this reason, a current caused by the second-order harmonic (including a current caused by a harmonic of an even-numbered order) is flowed through the diode 42, thereby more strongly generating a harmonic component. For this reason, the harmonic component is more strongly generated in the ON state. This harmonic component is radiated.

Therefore, when the diode 42 is in an OFF state, i.e., is not in a resonance state, no harmonic component is generated. Contrary to this, a harmonic component generated in the ON state is strong, i.e., as if a harmonic component were amplitude-modulated by the response signal, and is radiated as a harmonic signal.

If a diode which causes a nondestructive breakdown phenomenon such as a constant voltage diode or a tunnel diode is used as the diode 42, the diode may be biased to a breakdown region c to resonate with a microwave when the response signal is "0".

Figure 6:
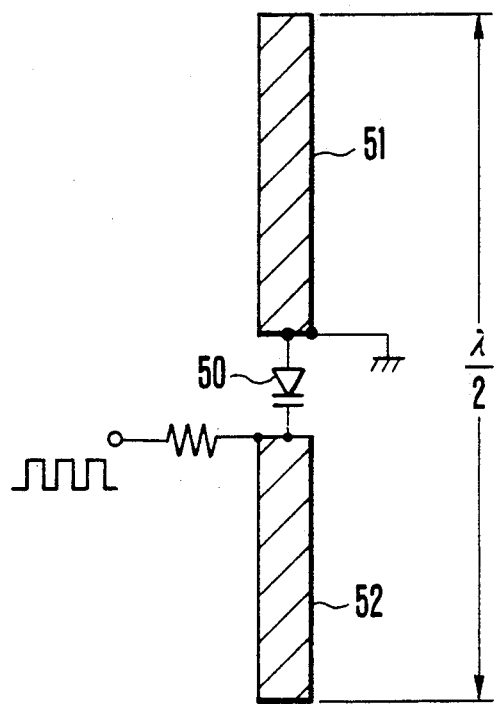
FIG. 6 is a view showing a structure of another embodiment of a microwave responder according to the present invention.
Figure 7:
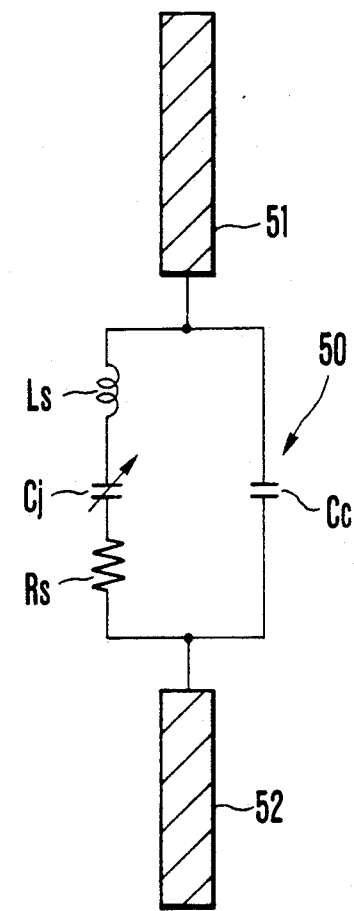
FIG. 7 is an equivalent circuit diagram of a varactor diode shown in FIG. 6.
Figure 8:
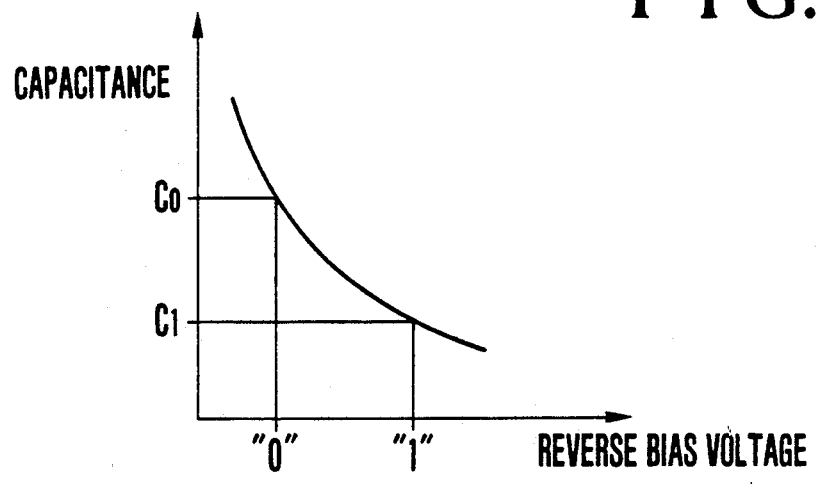
FIG. 8 is a graph showing characteristics of the varactor diode.

FIGS. 6 to 8 show another embodiment of a microwave responder according to the present invention.

The microwave responder shown in FIG. 6 comprises a varactor diode 50 in place of the diode 42 in the embodiment shown in FIG. 1. At the two ends of the varactor diode 50, two microstrip lines 51 and 52 are linearly arranged to constitute a microstrip resonator having a frequency of a microwave as a resonance frequency. The anode of the varactor diode 50 is grounded, and a response signal is supplied to the cathode. In an equivalent circuit of the varactor diode 50, as shown in FIG. 7, a series circuit of a junction capacitance $C_j$, a lead inductance $L_s$, and a lead resistance $R_s$ is connected in parallel with a case capacitance $C_c$. Note that the junction resistance $R_j$ is almost infinity, and is not shown. A reverse bias voltage of the varactor diode 50 is switched between levels "0" and "1" of the response signal, so that the junction capacitance $C_j$ is switched between a large capacitance $C_0$ and a small capacitance $C_1$, as shown in FIG. 8. If the resonance frequency of the microstrip resonator is set to coincide with the frequency of the microwave when the response signal is "0", a resonated microwave is radiated. When the response signal is "1", the resonance frequency of the microstrip resonator is shifted from the frequency of the microwave, and the microwave is phase-modulated by surrounding structures and is reflected. In addition, the degree of nonlinearity in the capacitance $C_0$ of the response signal "0" is higher than that in the capacitance $C_1$, as shown in FIG. 8, and hence, a harmonic component is more strongly generated in the capacitance $C_0$. Therefore, a response signal wave obtained by phase-modulating a microwave according to a response signal is sent back, and a harmonic signal wave is radiated as if it were amplitude-modulated by the response signal.

Since the microwave responder of the present invention is arranged as described above, the following effects can be provided.

That is, according to the present invention, a microwave is phase-modulated by a response signal, and is sent back as a response signal wave. In addition, the microwave responder of the present invention has a size ½ a wavelength of the resonated microwave, i.e., is very compact, and has a very simple structure.

Furthermore, since the two microstrip lines have different lengths, they can be easily matched with a diode.

Moreover, a harmonic component can be strongly generated by a high degree of nonlinearity of a diode in an ON state, and a degree of modulation of a harmonic signal wave can be enhanced.

In addition, a constant voltage diode or a tunnel diode may be used to enhance a degree of modulation of a harmonic signal wave, as described above.

A current corresponding to a harmonic component of an even-numbered order is flowed through the diode, and a harmonic component can be more strongly generated by this current.

Upon switching of a capacitance of a varactor diode, a microstrip resonator resonates or does not resonate with a microwave, and a response signal wave is sent back. In addition, a harmonic signal wave is radiated by nonlinearity of the varactor diode.

What is claimed is:

1. A microwave responder which resonates responsive to the presence of a microwave transmitted from a radio transmitter, and radiates the resonated microwave as a response signal wave, and wherein two microstrip lines are linearly arranged to be separated from each other at a predetermined interval a diode which is switched between ON and OFF states in response to the response signal is interposed between two end portions of said microstrip lines separated by the predetermined interval, and a distance, between distal ends of the two linearly arranged microstrip lines, which includes an impedance defined by the ON and OFF state of said diode is determined to be ½ a wavelength of the microwave.

2. A responder according to claim 1, wherein said two microstrip lines respectively connected to an anode and a cathode have different lengths to be matched with said diode in accordance with a difference between the impedance of said diode measured with reference to said anode and the impedance of said diode measured with reference to said cathode.

3. A responder according to claim 1, wherein said diode is biased to a forward rise voltage region to be set in the ON state and to resonate with the microwave in response to said response signal.

4. A responder according to claim 1, wherein said diode is biased to a breakdown region to be set in the ON state and to resonate with the microwave in response to said response signal.

5. A responder according to claim 3 or 4, wherein said diode is arranged to be offset from the center of the distance between the distal ends of the two linearly arranged microstrip lines.

6. A responder according to claim 1 or 2, wherein said diode comprises a varactor diode whose capacitance is switched according to said response signal.

* * * * *

UNITED STATES PATENT AND TRADEMARK OFFICE
CERTIFICATE OF CORRECTION

PATENT NO. : 5,119,099
DATED : June 2, 1992
INVENTOR(S) : Haruyama et al.

It is certified that error appears in the above-identified patent and that said Letters Patent is hereby corrected as shown below:

In column 6 at line 38 replace "interval" with --interval,--;

In column 6 at line 44 replace "ON and OFF" with --ON or OFF--.

Signed and Sealed this

Twelfth Day of September, 1995

Attest:

BRUCE LEHMAN

Attesting Officer    Commissioner of Patents and Trademarks